US010602388B1

(12) United States Patent
Rengarajan et al.

(10) Patent No.: US 10,602,388 B1
(45) Date of Patent: Mar. 24, 2020

(54) APPLICATION QUALITY OF EXPERIENCE METRIC

(71) Applicant: wildfire.exchange, inc., San Francisco, CA (US)

(72) Inventors: Balaji Rengarajan, Campbell, CA (US); Igal Gutkin, Redwood City, CA (US); Thomas Paul, Santa Clara, CA (US)

(73) Assignee: Plume Design, Inc., Palo Alto, CA (US)

( * ) Notice: Subject to any disclaimer, the term of this patent is extended or adjusted under 35 U.S.C. 154(b) by 609 days.

(21) Appl. No.: 14/845,046

(22) Filed: Sep. 3, 2015

Related U.S. Application Data

(60) Provisional application No. 62/045,339, filed on Sep. 3, 2014.

(51) Int. Cl.
*H04L 12/26* (2006.01)
*H04W 24/10* (2009.01)

(52) U.S. Cl.
CPC .......... *H04W 24/10* (2013.01); *H04L 43/0852* (2013.01)

(58) Field of Classification Search
CPC ..... H04L 43/00; H04L 29/06; H04L 12/2602; H04L 41/22; H04L 43/0852; H04L 12/26; H04L 29/08072; H04L 67/16; H04L 67/1025; H04L 67/322; H04L 43/04; H04L 43/10; H04L 29/08; H04W 24/10; G06F 9/5088; G06F 11/3006; G06F 11/30; G06F 9/50

USPC ................. 709/224, 227; 340/16.1; 370/252; 714/39, 47.1–47.3
See application file for complete search history.

(56) References Cited

U.S. PATENT DOCUMENTS

| | | | | |
|---|---|---|---|---|
| 2005/0157676 A1* | 7/2005 | Kwak | ................... | H04W 28/14 370/328 |
| 2008/0253314 A1* | 10/2008 | Stephenson | ........... | H04W 24/08 370/326 |
| 2012/0027093 A1* | 2/2012 | Amon | ..................... | H04N 7/152 375/240.16 |
| 2012/0327779 A1* | 12/2012 | Gell | ..................... | H04L 47/2475 370/238 |
| 2014/0094159 A1* | 4/2014 | Raleigh | ................. | H04W 24/02 455/418 |
| 2014/0219088 A1* | 8/2014 | Oyman | ............ | H04N 21/23439 370/231 |

(Continued)

*Primary Examiner* — Philip J Chea
*Assistant Examiner* — Mehulkumar J Shah
(74) *Attorney, Agent, or Firm* — Clements Bernard Walker; Lawrence A. Baratta, Jr.

(57) ABSTRACT

A method of evaluating an application performance metric of a Wi-Fi device that is running an application and that is receiving application data from another Wi-Fi device transmitting the application data is disclosed. An indication of a delay in one or more of a plurality of access category queues at the Wi-Fi device transmitting the application data is received. The delay over time is characterized, wherein the characterization of the delay over time includes a statistical measure of the delay determined based on the received indication of the delay in the one or more of the plurality of access category queues. An application quality-of-experience (QoE) metric is determined based on a mapping from the characterization of the delay over time to an application performance.

22 Claims, 11 Drawing Sheets

(56) References Cited

U.S. PATENT DOCUMENTS

2014/0226658 A1* 8/2014 Kakadia .............. H04L 43/0882
370/389
2014/0328190 A1* 11/2014 Lord .................... H04W 24/08
370/252

* cited by examiner

APPLICATION QUALITY OF EXPERIENCE METRIC

CROSS REFERENCE TO OTHER APPLICATIONS

This application claims priority to U.S. Provisional Patent Application No. 62/045,339 entitled QOE METRIC filed Sep. 3, 2014 which is incorporated herein by reference for all purposes.

BACKGROUND OF THE INVENTION

Different metrics may be used to estimate network performance: the metrics include throughput, Wi-Fi channel busyness ratio, packet error rate, the MCS (modulation and coding scheme) rate of the access point (AP), the received signal strength indication (RSSI) of the clients, and the like. The metrics enable system administrators to visualize network quality and its impact on users. The metrics can also serve, in part or in whole, as the components of an overall objective for different radio resource management (RRM) algorithms. However, the network performance metrics may not reflect the actual quality of the user experience of different applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
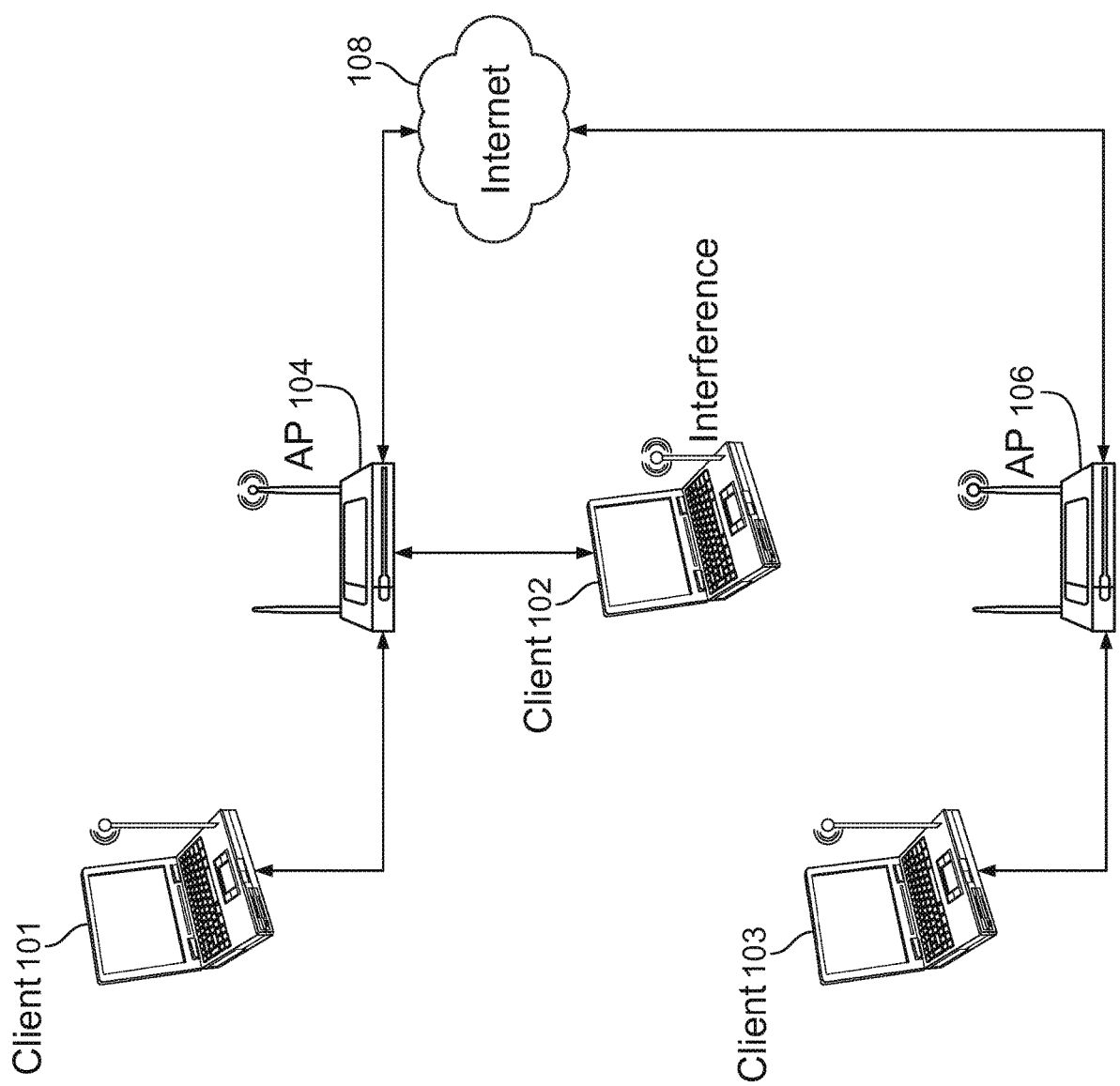
FIG. 1 illustrates a Wi-Fi network in which a Wi-Fi-enabled client (client 101, client 102, or client 103) may connect to any authorized AP (104 or 106) when the client is within the AP's coverage area.

Wi-Fi networks are often formed using one or more Wi-Fi access points (APs), which can be deployed in homes, apartments, office buildings, and as outdoor hotspots. For the purposes of this description, "AP" is understood to include any Wi-Fi node which relays or bridges data. This includes Wi-Fi APs, Wi-Fi routers, Wi-Fi repeaters, and Wi-Fi mesh nodes that are forwarding or otherwise transmitting data. FIG. 1 illustrates a Wi-Fi network in which a Wi-Fi-enabled client (client 101, client 102, or client 103) may connect to any authorized AP (104 or 106) when the client is within the AP's coverage area. For the purposes of this description, Wi-Fi client is understood to include all Wi-Fi devices that receive information over Wi-Fi, including such devices as phones, PCs, set top boxes, mesh nodes, or even in some cases APs, gateways, routers, and repeaters. The APs are connected to the backbone Internet 108, with traffic routed to and from their clients via standard Internet protocols.

Figure 2:
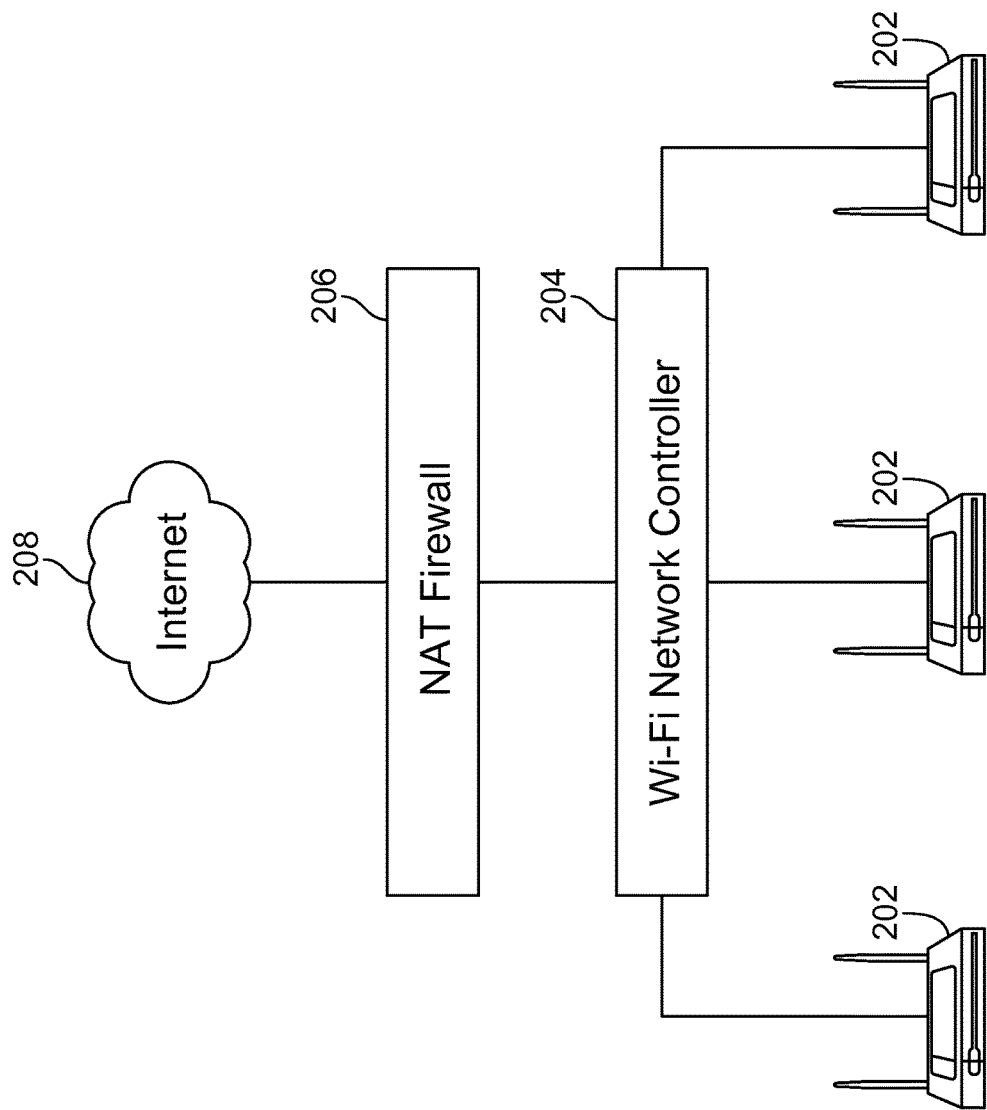
FIG. 2 illustrates an embodiment of a plurality of APs that are managed by a Wi-Fi-network controller.

Traditionally, APs are attached to a wired network and managed by a Wi-Fi network controller, which may handle automatic adjustments to RF power, channel assignment, authentication, security, and the like. FIG. 2 illustrates an embodiment of a plurality of APs that are managed by a Wi-Fi-network controller. As shown in FIG. 2, the APs 202 are managed locally by a Wi-Fi network controller 204, and both the APs 202 and Wi-Fi network controller 204 are connected to the Internet 208 behind a Network Address Translation (NAT) firewall 206. The system as shown in FIG. 2 has a number of drawbacks. For example, APs 202 and Wi-Fi network controller 204 must be purchased from the same vendor. In addition, Wi-Fi network controller 204 must be deployed on the premises behind NAT firewall 206.

Figure 3:
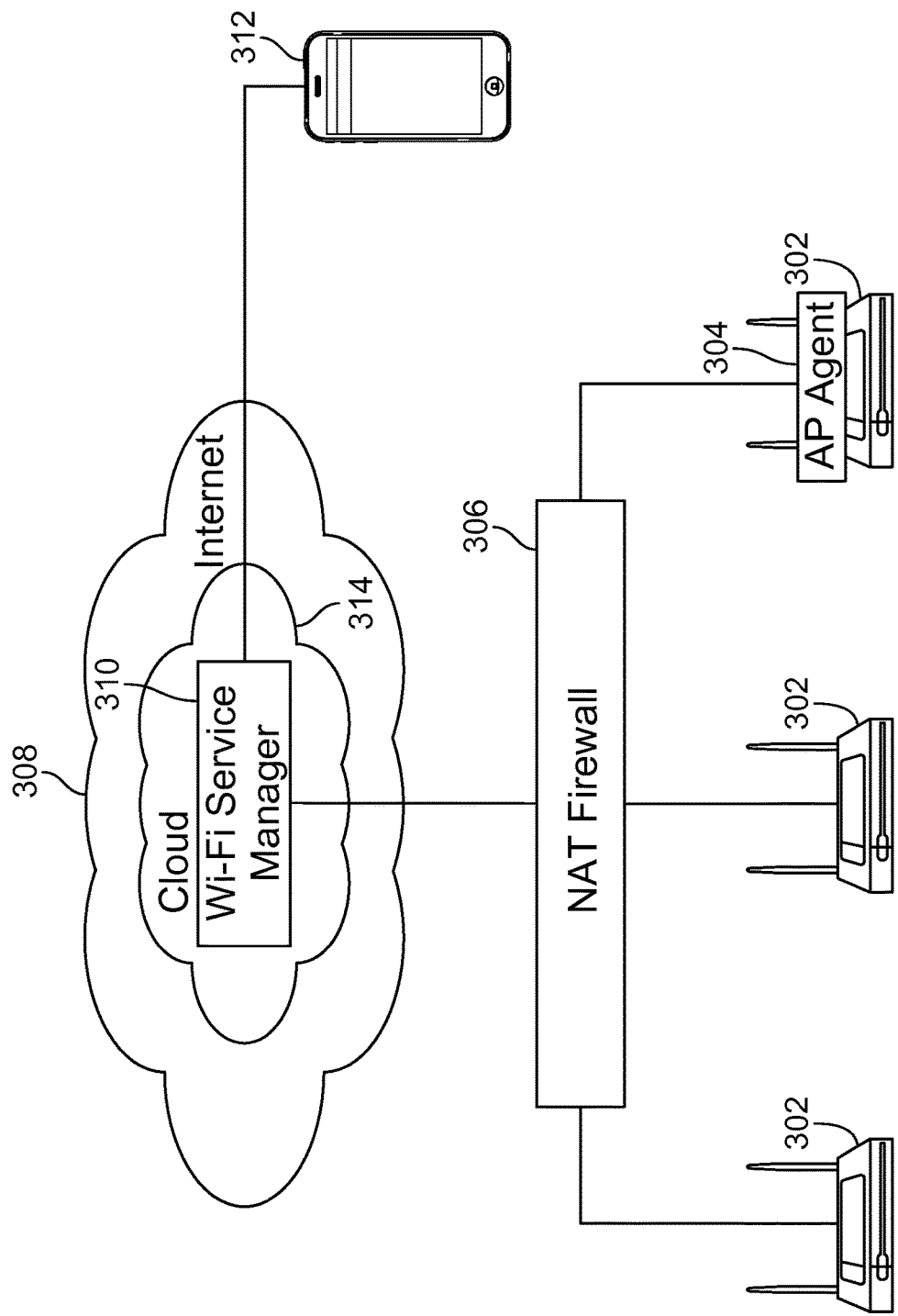
FIG. 3 illustrates an embodiment of a plurality of APs that are managed by a cloud-based Wi-Fi service manager, wherein the Wi-Fi service may be activated, configured, and monitored by a user using a user interface accessible by an application (e.g., a mobile application or web browser) running on a mobile device.

FIG. 3 illustrates an embodiment of a plurality of APs that are managed by a cloud-based Wi-Fi service manager, wherein the Wi-Fi service may be activated, configured, and monitored by a user using a user interface accessible by an application (e.g., a mobile application or web browser) running on a mobile device. As shown in FIG. 3, a cloud-based AP agent 304 is installed on each of the APs 302. APs 302 are managed by a cloud-based Wi-Fi service manager 310 that is deployed in a cloud 314. A user may use an application running on a mobile device 312 to activate, configure, and monitor APs 302 remotely through the Internet 308 via the Wi-Fi service manager.

The system in FIG. 3 has a number of advantages. The APs 302 that are managed by cloud-based Wi-Fi service manager 310 are not limited to APs offered by a single vendor, but can be APs that are offered by any third party vendor. In addition, APs 302 do not need to be managed locally by a manager or controller that is deployed on-premise behind a NAT firewall. Instead, APs 302 can be managed by a cloud-based Wi-Fi service manger 310 deployed in a cloud 310 external to a NAT Firewall 306. Furthermore, the Wi-Fi service may be activated, configured, and monitored remotely through a mobile device by a human user, such as an IT (information technology) administrator.

Cloud-based AP agents are installed onto the APs. A cloud-based AP agent may be installed onto an AP by an end-user who purchases the third-party AP off the shelf. For example, the end-user may download a cloud-based AP agent from a website and install the agent onto the AP himself. The cloud-based AP agent may also be compiled into the firmware distribution.

Figure 4:
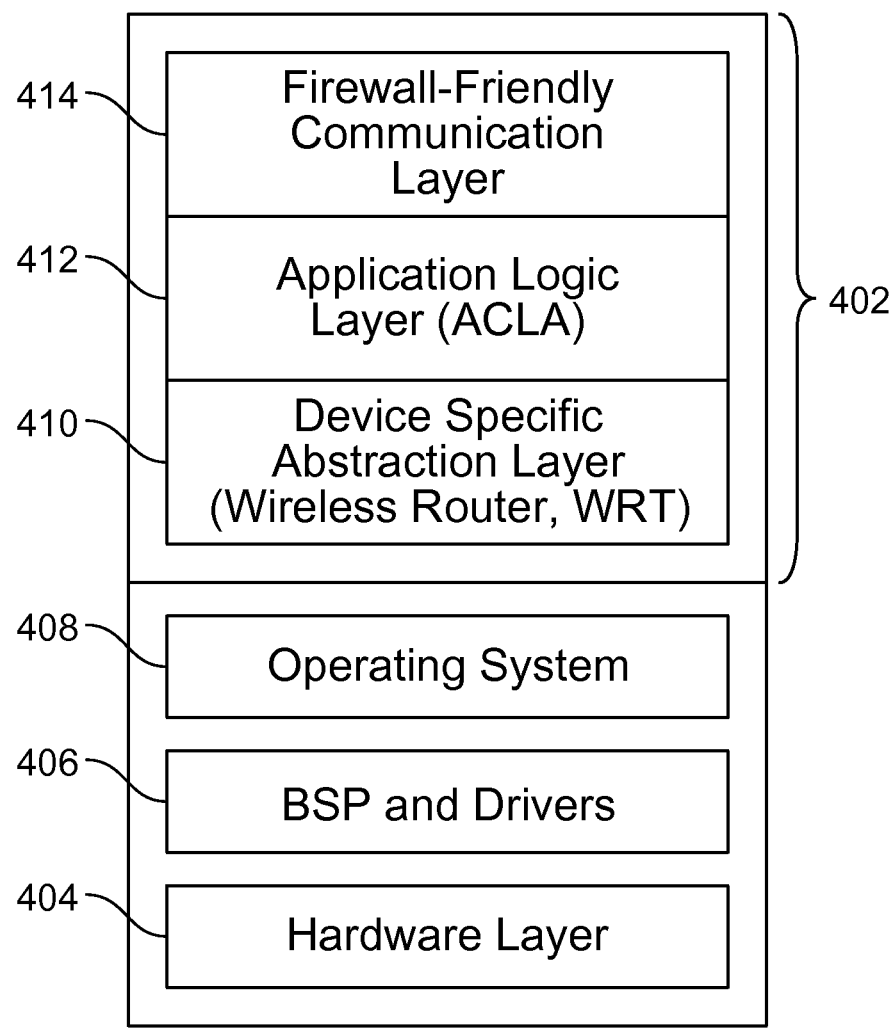
FIG. 4 illustrates an embodiment of a cloud-based AP agent installed on a third party AP.

FIG. 4 illustrates an embodiment of a cloud-based AP agent installed on a third party AP. Before the installation of the cloud-based AP agent firmware, the third party AP includes a number of layers and components, including a hardware layer 404, a board support package (BSP) and drivers 406, and an operating system (OS) 408. A cloud-based AP agent 402 is installed on top of the above-mentioned layers and components of the third party AP.

Cloud-based AP agent 402 includes a device specific abstraction layer 410, an application logic layer (ACLA) 412 and a firewall-friendly communication layer 414. Device specific abstraction layer 410 is hardware and firmware dependent, while application logic layer 412 and firewall-friendly communication layer 414 are hardware and firmware independent. Because cloud-based AP agent 402 needs to be compatible with third-party APs, it includes a device specific abstraction layer 410 to interface with the hardware and firmware of different types of third-party APs. For example, device specific abstraction layer 410 includes interfaces to the monitoring and configuration parameters specific to any particular AP. In addition, device specific abstraction layer 410 is an abstraction layer that hides the hardware and firmware differences from the upper layers, including application logic layer 412 and firewall-friendly communication layer 414. Therefore, the logic included in application logic layer 412 and firewall-friendly communication layer 414 can stay unchanged irrespective of the different hardware and firmware layers used by different third party AP vendors.

Application logic layer 412 includes logic for statistics reporting and configuration. Firewall-friendly communication layer 414 maintains secured and authenticated connections with cloud-based Wi-Fi service manger 310. Firewall-friendly communication layer 414, unlike other protocols, allows not only data and information to be transferred from cloud-based AP agent 402 out of a NAT firewall, but also allows configuration parameters and control information to be pushed from cloud-based Wi-Fi service manager 310 down to cloud-based AP agent 402, even when cloud-based AP agent 402 is located behind a NAT firewall. One example of a firewall-friendly communication layer is the Extensible Messaging and Presence Protocol (XMPP). However, other firewall-friendly communication layer may be used as well.

Because cloud-based Wi-Fi service manager 310 can establish communication sessions with the AP agents 304, cloud-based Wi-Fi service manager 310 may receive measurements and messages from the AP agents 304 for various purposes. For example, cloud-based Wi-Fi service manager 310 may use the information collected from the AP agents 304 to monitor the performance of the APs 302 and their respective associated clients. Cloud-based Wi-Fi service manager 310 may also use the collected information to diagnose any problems with the connections between the APs 302 and their clients. Furthermore, cloud-based Wi-Fi service manager 310 may use the collected information to optimize the overall performances of the APs and their clients by dynamically determining the various configuration parameters of the APs and their clients and sending the updated configuration parameters to the AP agents 304. The various configuration parameters include any Wi-Fi parameters, such as parameters related to RF power, channel assignment, authentication, security, and the like.

Different metrics have been used to estimate network performance. The metrics include throughput, Wi-Fi channel busyness ratio, packet error rate, the modulation and coding scheme (MCS) rate of the AP, the received signal strength indication (RSSI) of the clients, and the like. The metrics enable system administrators to visualize network quality and its impact on users. The metrics can also serve, in part or in whole, as the components of an overall objective for different radio resource management (RRM) algorithms.

However, the network performance metrics may not reflect the actual quality of the user experience of different applications. Some metrics represent the performance of certain types of traffic or applications well, but are not good representatives of the performance of all traffic and application types. For instance, different applications require different levels of throughput to achieve certain levels of quality; an acceptable throughput level for one application may not be sufficient for another application. For example, a streaming video application, such as Netflix or YouTube, requires a much higher throughput than other types of applications in order to provide a satisfactory user viewing experience. Saturation throughput is defined as the limit reached by the system throughput as the system load increases. Saturation throughput is evaluated under overloaded conditions, i.e., the transmission queue of each station is assumed to be always nonempty. Saturation throughput is a reasonably good representative of the system performance when a user is downloading a large file (e.g., a file that is a few gigabytes or more in size), but not necessarily a good representative of the performance for other types of traffic, including other best-effort traffic (e.g., web browsing), streaming video, and real time traffic. In addition, saturation throughput cannot be measured without artificially saturating the AP with heavy traffic.

In the present application, the application level performance experienced by a user of a Wi-Fi client while running a particular application on the Wi-Fi client is predicted and quantified by a quality-of-experience (QoE) metric determined by a cloud-based Wi-Fi service manager. A lower QoE metric indicates a lower level of application level performance, and a higher QoE metric indicates a higher level of application level performance. The application level QoE metric can be used by cloud-based Wi-Fi service manager 310 for Wi-Fi network monitoring, diagnostics, visualization, optimization, and management.

As will be described in greater detail below, the application level QoE metric indicates the impact of the AP on the user level performance based on measurements collected by the AP agent and sent to the cloud-based Wi-Fi service manager, including measurements at the media access control (MAC) layer of the AP. The AP agent periodically samples the priority queues associated with the four Access Categories (AC) voice, video, best effort, and background. By constructing the statistics of the priority queues, including the queue length and queue backlog, and combining the statistical data with other AP information, including data on the MCS (modulation and coding scheme) used by the AP and the size of the protocol data units (PDUs), an application level QoE can be determined.

Figure 5:
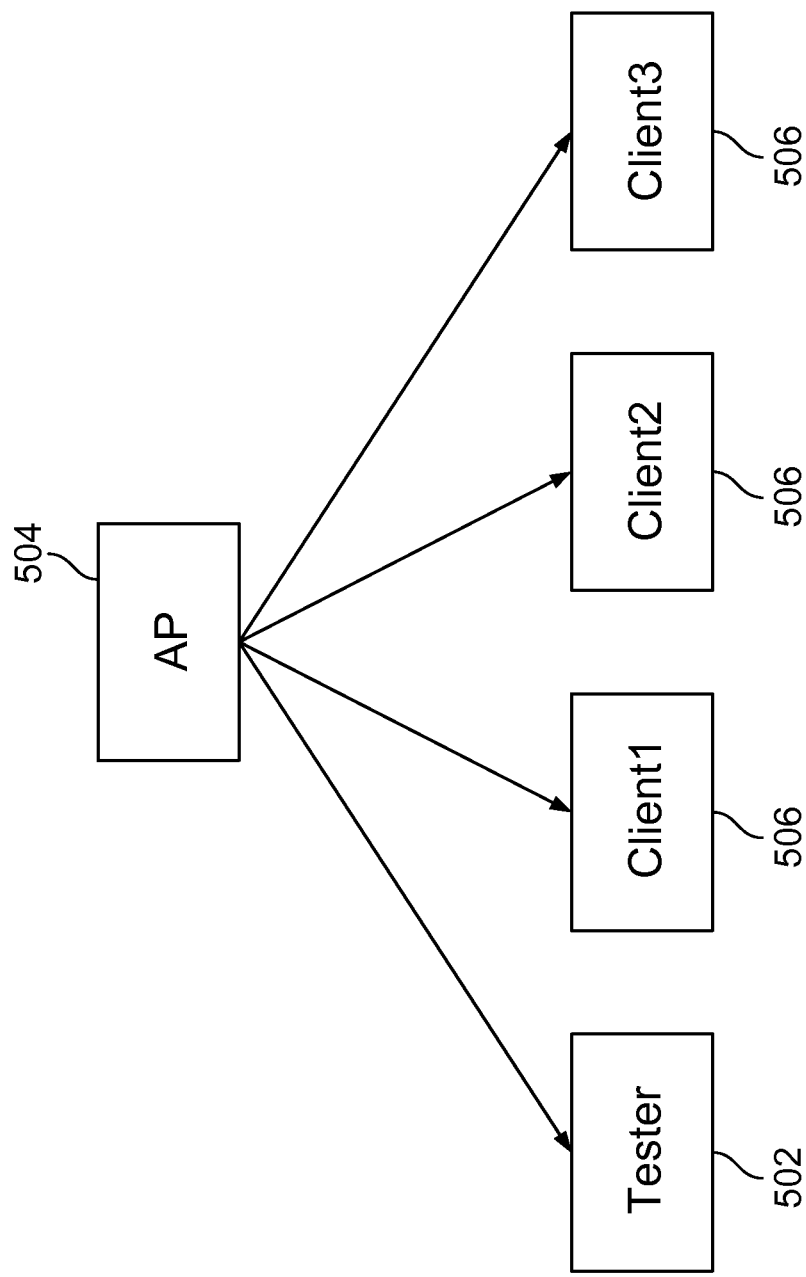
FIG. 5 illustrates a fictional tester 502 that is associated with an AP 504 as if it is one of the Wi-Fi clients 506.

The application level QoE is targeted to estimate the application level performance experienced by a user of a Wi-Fi client without adding extra traffic. FIG. 5 illustrates a fictional tester 502 that is associated with an AP 504 as if it is one of the Wi-Fi clients 506. Fictional tester 502 estimates the performance of a client associated with AP 504 without adding extra traffic that is handled by AP 504. Fictional tester 502 is targeted to quantify the performance of different applications, e.g., video, web browsing, and voice, as experienced by a Wi-Fi client. The application level QoE should mirror a performance metric that fictional tester 502 would measure, but the application level QoE is determined based on data collected from AP 504 that is sent to the cloud-based Wi-Fi service manager.

Figure 6:
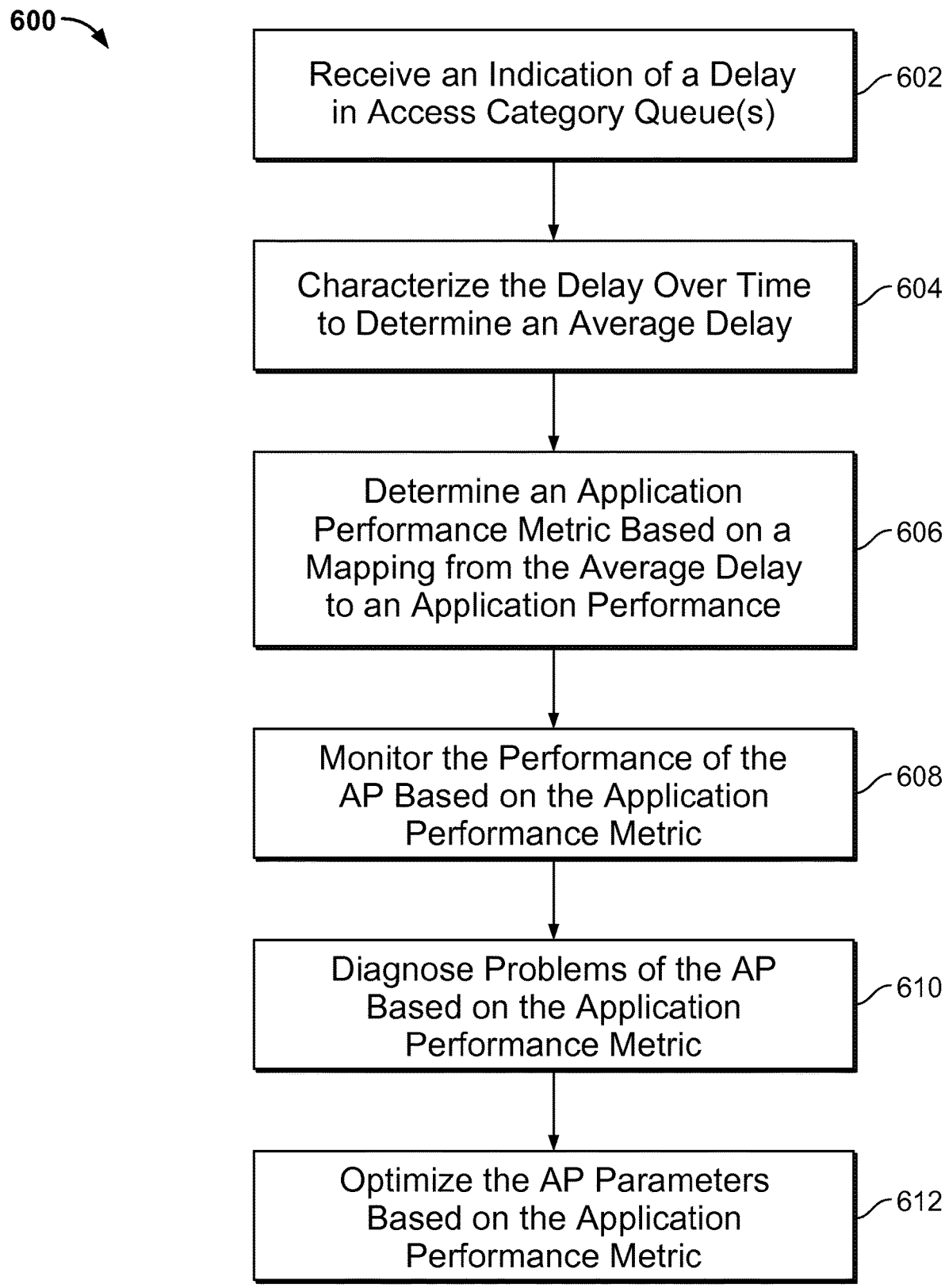
FIG. 6 illustrates an embodiment of a process 600 for measuring an application performance metric of a Wi-Fi client associated with an AP.

FIG. 6 illustrates an embodiment of a process 600 for measuring an application performance metric of a Wi-Fi client associated with an AP. The application performance metric predicts a quality-of-experience (QoE) experienced by a user of a Wi-Fi client while running a particular application on the Wi-Fi client. Process 600 can be used to determine QoE metrics for different types of applications with different types of traffic, including voice, video, best-effort, and background traffic. As an illustrative example, a process 600 for determining a QoE metric of a Wi-Fi client while running an application that requires best-effort traffic (e.g., web browsing) is provided below.

At 602, the cloud-based Wi-Fi service manager receives from the AP agent an indication of a delay in one or more of a plurality of access category queues at the AP. As will be described in greater detail below, the indication of delay may be one or more of the following: time-stamps of when a set of data enters and leaves one or more of the access category queues, an indication of a queue length, an indication of a queue backlog, or an indication of a queue utilization. The indication of the delay in one or more of the plurality of access category queues at the AP need not be direct measurements of actual delays: it may be comprised of indicators or summaries that can be used to infer the amount of delay in the access category queues over time.

Figure 7:
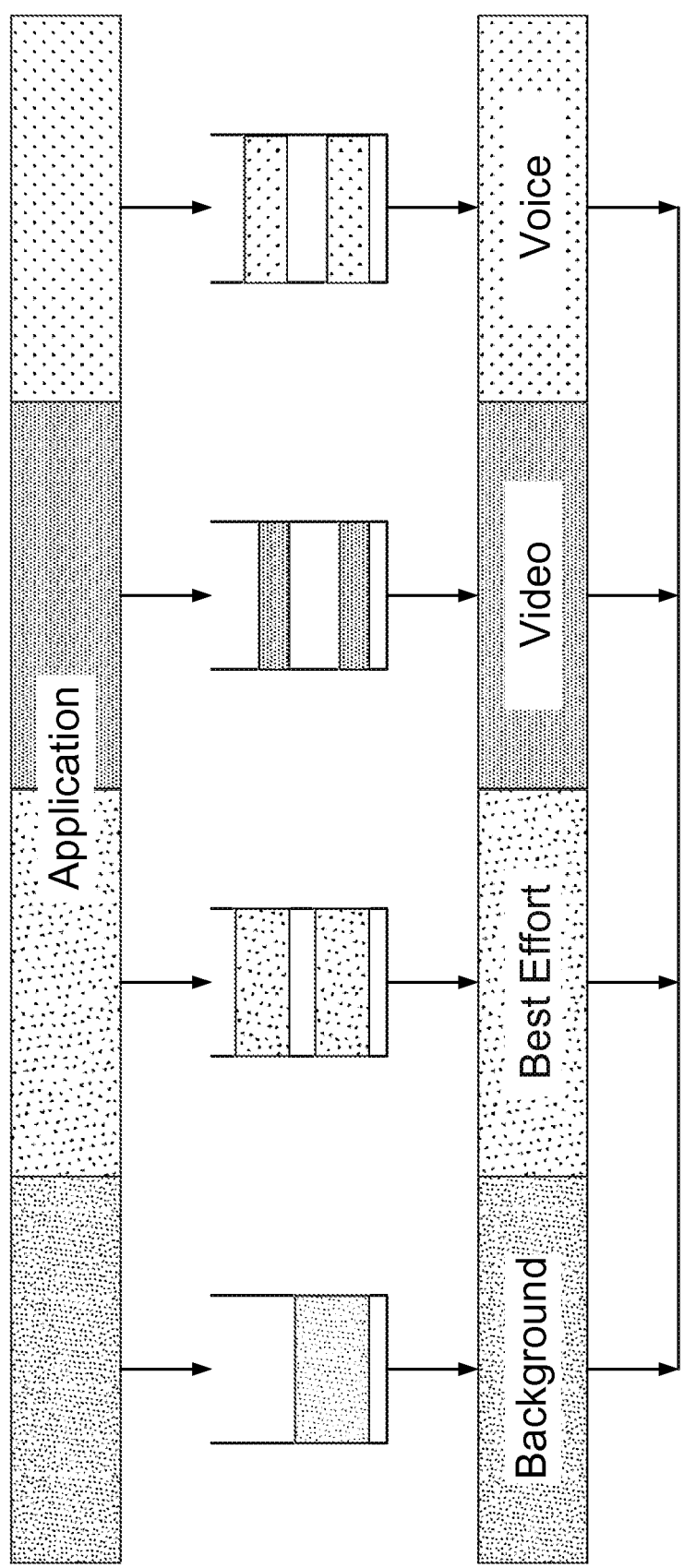
FIG. 7 illustrates four separate queues, one for each of the access categories.

Wi-Fi Multimedia (WMM) provides quality of service (QoS) features to IEEE 802.11 networks. WMM prioritizes traffic according to four Access Categories (AC) voice, video, best effort, and background. Wi-Fi network performance may have varying degrees of impact on an application's performance depending on the traffic types associated with the application. FIG. 7 illustrates four separate queues, one for each of the access categories. If more than one frame from different access categories collide internally, then the frame with the higher priority is sent.

Figure 8B:
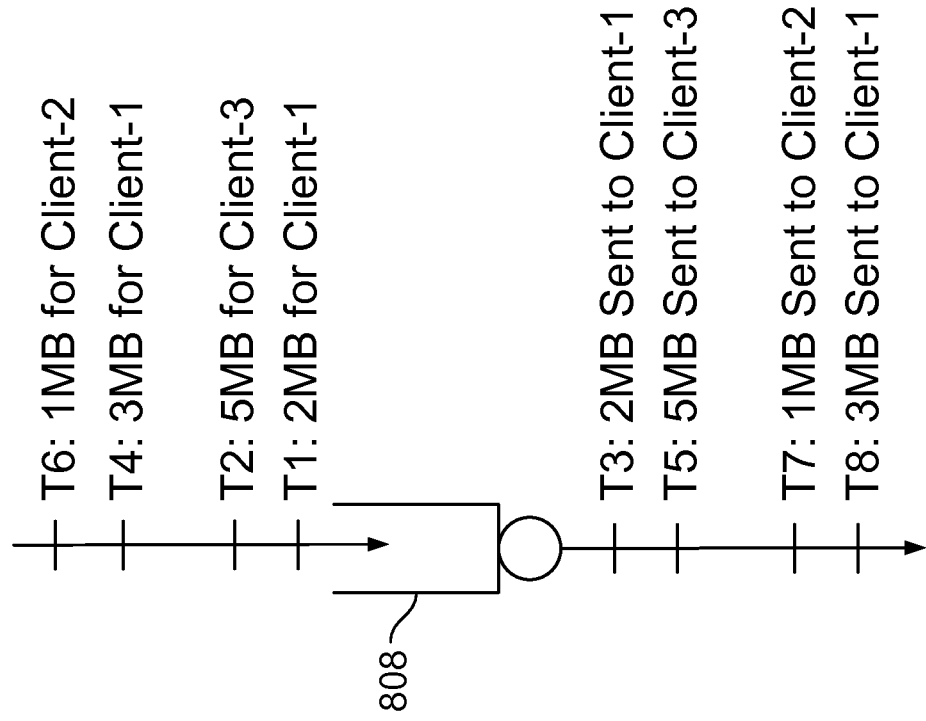
FIGS. 8A and 8B illustrate that data received by an AP from the Internet enters the access category queues of the AP and that different amounts of delay are introduced to different portions of the data.
Figure 8A:
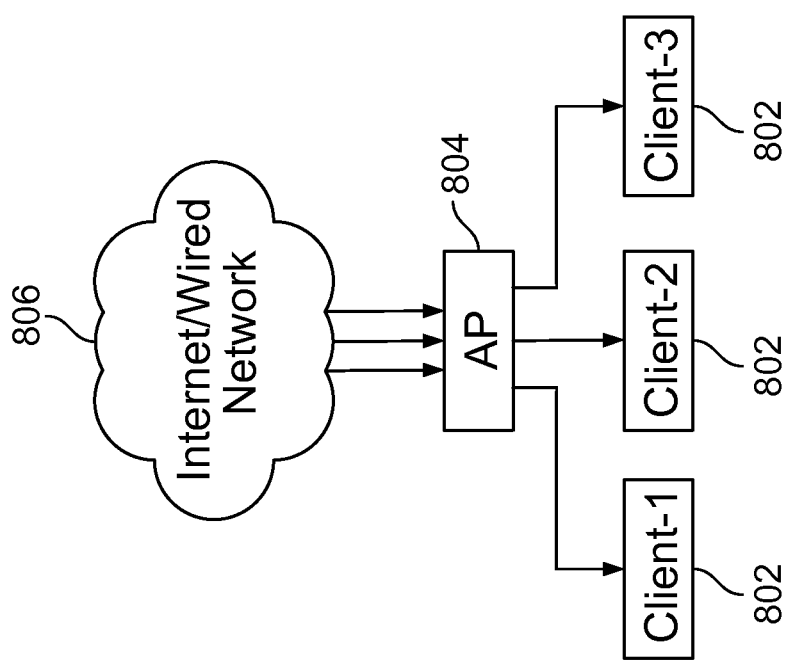

FIGS. 8A and 8B illustrate that data received by an AP from the Internet enters the access category queues of the AP and that different amounts of delay are introduced to different portions of the data. In FIG. 8A, data that is sent from the Internet/wired network 806 is received by AP 804. The received data enters the access category queues of AP 804 and is subsequently sent to different clients 802—client-1, client-2, and client-3. Assuming that the data sent to the clients belongs to the best-effort category, then the received data is queued into the best-effort queue 808, as shown in FIG. 8B. The delay associated with the data sent to a particular client 802 is the time when the data leaves queue 808 minus the time when the data arrives at queue 808. For example, as shown in FIG. 8B, the delay associated with the 2 MB data (e.g., a page or file that is 2 MB in size) sent from AP 804 to client-1 is T3 minus T1, where T3 is the time-stamp when the 2 MB data leaves the queue and T1 is the time-stamp when the 2 MB data arrives at the queue. In another example, the delay associated with the 5 MB data sent from AP 804 to client-3 is T5 minus T2, where T5 is the time-stamp when the 5 MB data leaves the queue and T2 is the time-stamp when the 5 MB data arrives at the queue. The time-stamps of when each set of data enters and leaves the one or more access category queues may be collected by the AP agent and sent to the cloud-based Wi-Fi service manager as an indication of a delay in the access category queues at the AP.

Another indication of a delay in the access category queues at the AP that can be collected by the AP agent and sent to the cloud-based Wi-Fi service manager is the queue length of the access category queues. For example, the AP agent may periodically sample the queues at the AP by calling an API (application programming interface) to determine their queue lengths. The queue lengths may be measured in #mpdu or #ampdu, where #mpdu is the number of media access control (MAC) protocol data units and #ampdu is the number of aggregated MAC protocol data units.

Another indication of a delay in the access category queues at the AP that can be collected by the AP agent and sent to the cloud-based Wi-Fi service manager is an indication of whether there is a queue backlog in the access category queues. For example, the AP agent may periodically sample the queues at the AP by calling an API to determine their queue lengths. In some embodiments, it is determined that there is a queue backlog at time t1 if there is a non-zero queue length sampled at time t1. For example, if the application requires voice traffic only, then queue backlog is equal to 1 (true) if the queue length of the voice access category queue is non-zero, and queue backlog is equal to 0 (false) if the queue length of the voice access category queue is zero. In another example, if the application requires best-effort traffic, then queue backlog is equal to 1 (true) if the sum of the queue lengths of the voice, video, and best-effort queues is nonzero, and queue backlog is equal to 0 (false) if the sum of the queue lengths of these queues is zero.

Another indication of a delay in the access category queues at the AP that can be collected by the AP agent and sent to the cloud-based Wi-Fi service manager is the queue utilization of the access category queues. For example, a queue utilization metric may be determined as the fraction of time when the queue is backlogged.

All of the above described indications of delay can be determined using packets transmitted through the network specifically for finding the QoE level. However, such packets would take time on the airwaves, reducing the time available to transmit useful data. The reduction in network throughput is undesirable. A better approach would be to utilize only useful data carrying packets that are naturally present in the network. The techniques described here are able to operate successfully on only the data traffic that is naturally present in the network, without adding overhead or reducing the useful throughput.

With continued reference to FIG. 6, at 604, the delay in the one or more of the access category queues at the AP is characterized over time. The delay can be characterized over time in different ways. In some embodiments, an average delay is determined based on the received indication of the delay in the one or more of the access category queues. In some embodiments, in addition to an average delay, a standard deviation of the delay (i.e., jitter) is determined based on the received indication of the delay in the one or more of the access category queues.

For applications that require best-effort data traffic, an average delay can be used to characterize the delay over time. In one example, an average queue length is determined based on the queue utilization metric, e.g., the queue utilization metric received at step 602:

Average queue length=alpha*utilization/(1-utilization)

where alpha is a parameter that depends on the second order moment of the size of each packet/frame.

An average delay is then determined based on the average queue length and the arrival rate:

Average delay=Average queue length/Arrival rate where the arrival rate is the estimated number of packets/frames per second that arrive at the AP. The arrival rate may be determined periodically by the AP agent and sent to the cloud-based Wi-Fi service manager.

The characterization of the delay over time determined at step 604 is based on information collected at the MAC layer, but not at the application layer. However, if the AP is the cause of the backlog, then an estimate of the utilization of the AP queues can be a good estimate of the utilization at the application layer as well.

Figure 9:
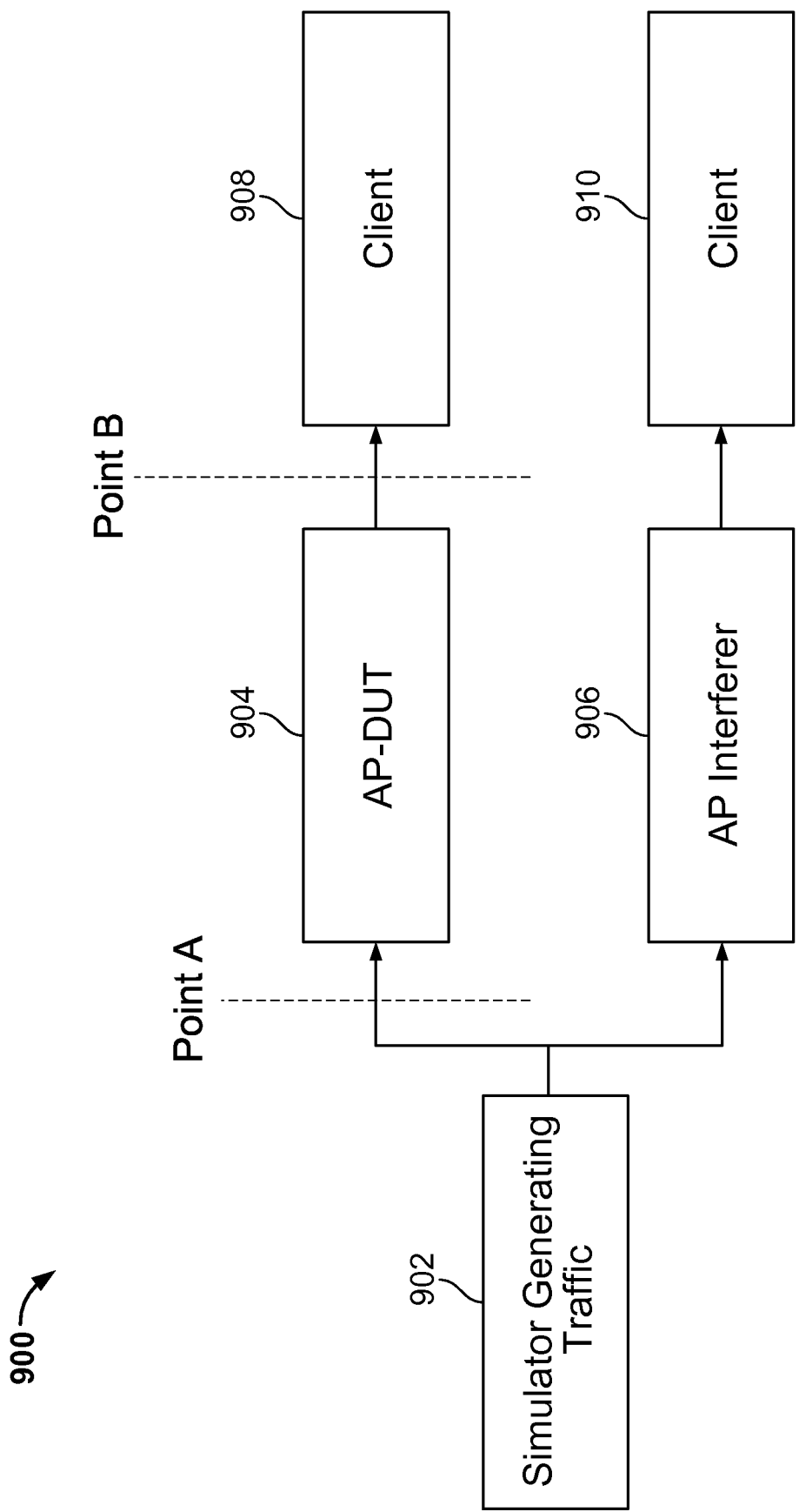
FIG. 9 illustrates an embodiment of a test system 900 for determining whether an estimate of the average delay in the AP queues can provide a good estimate of the average delay at the application layer.
Figure 10:
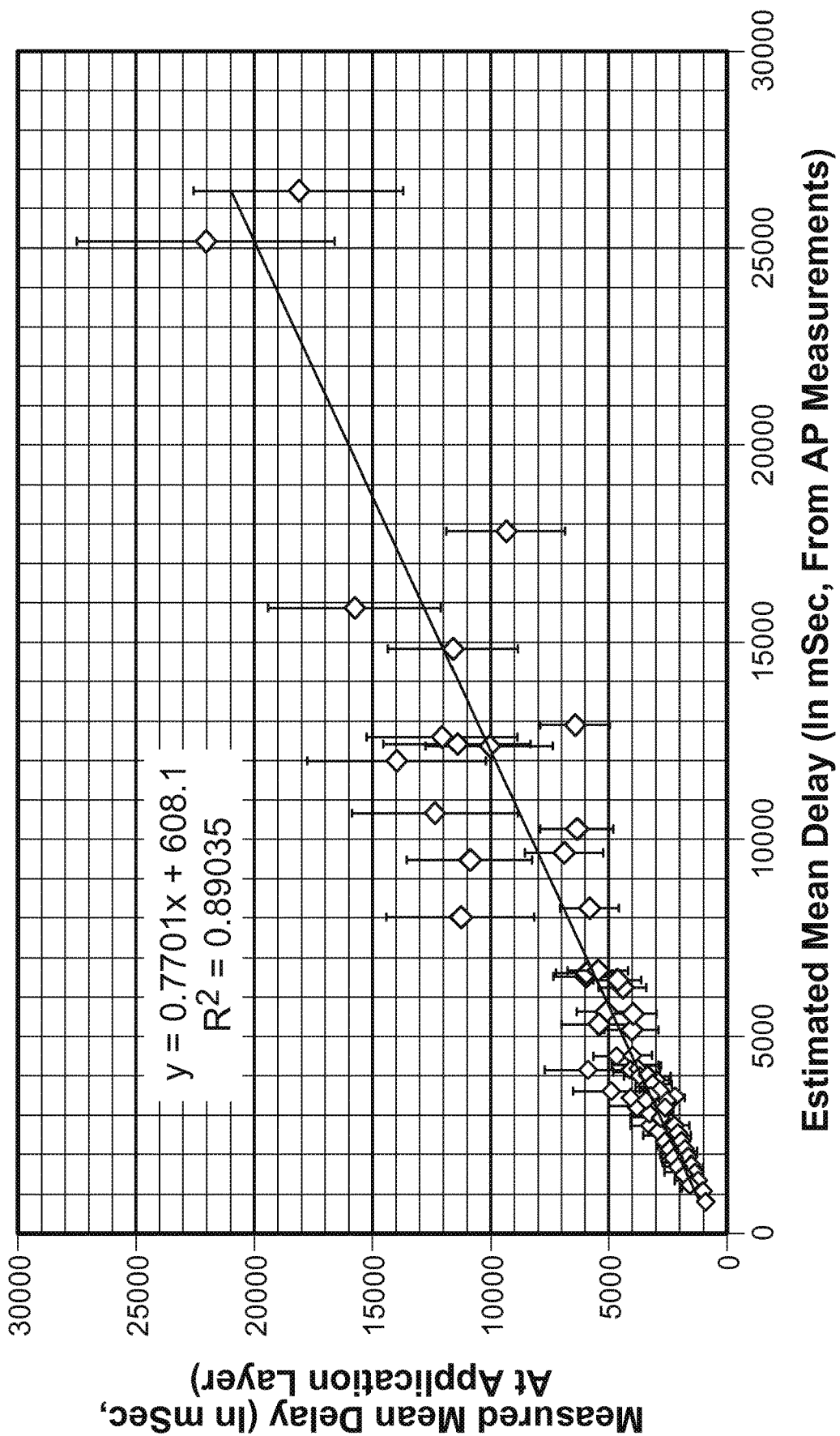
FIG. 10 illustrates that an estimate of the average delay in the AP queues can provide a good estimate of the average delay at the application layer because the plot of the two variables substantially fall on a line at a 45 degrees angle.

FIG. 9 illustrates an embodiment of a test system 900 for determining whether an estimate of the average delay in the AP queues can provide a good estimate of the average delay at the application layer. A simulator 902 is used to generate Internet-like traffic to AP 904 and AP 906. By varying the file size, arrival rate, and interference, different traffic patterns may be generated. AP 904 is the device under test (DUT). AP 906 is an AP that will generate different levels of interference that can affect the performance of AP 904. AP 904 and AP 906 are connected to Wi-Fi client 908 and Wi-Fi client 910, respectively. To measure the actual delay of a set of data (e.g., a packet or frame) at the application level, the difference between the time-stamp of the data leaving simulator 902 (point A) and the time-stamp of the data leaving AP 904 (point B) is recorded. An estimate of the average delay in the AP queues can be estimated using steps 602 to 604 of process 600 described above. FIG. 10 illustrates that an estimate of the average delay in the AP queues (x-axis) can provide a good estimate of the average delay at the application layer (y-axis) because the plot points of the two substantially fall on a line of 45 degrees angle.

At 606, an application quality-of-experience (QoE) metric is determined based on a mapping from the characterization of the delay over time to an application's performance. Different mappings can be determined for different types of applications requiring different types of traffic.

Figure 11:
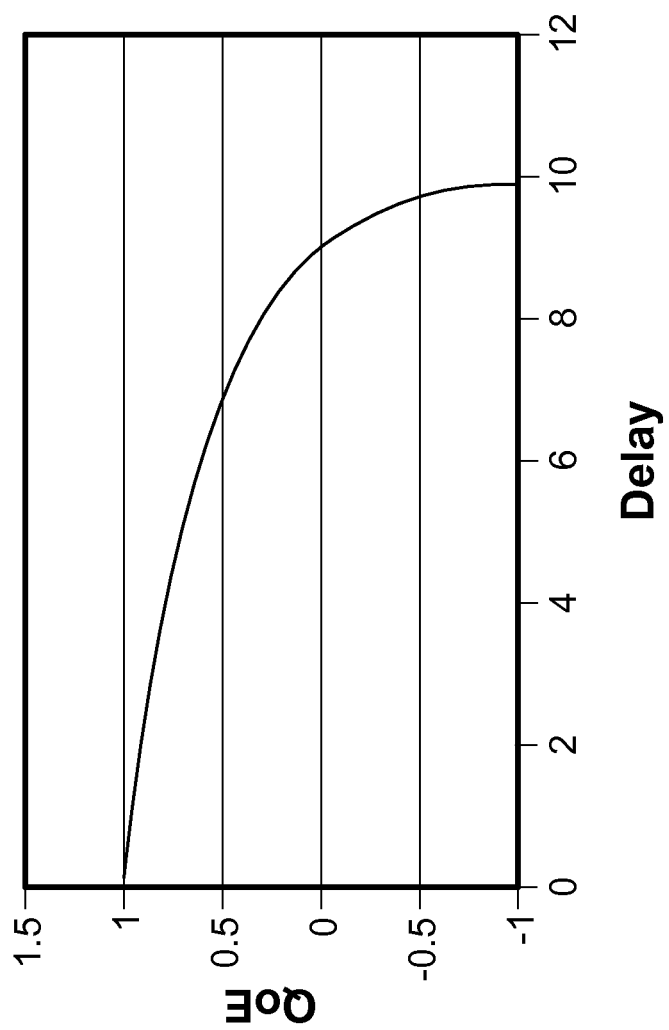
FIG. 11 illustrates an example of a mapping from an average delay to a measure of application level performance.

FIG. 11 illustrates an example of a mapping from an average delay to an application level performance. As shown in FIG. 11, when the average delay is relatively small, the application performance stays relatively high, but when the average delay rises beyond a certain level, the application performance perceived by a user drops sharply. The mapping is different for different applications and may be calibrated based on the type of application or the one or more types of data traffic (e.g., the one or more access categories) generated by the application. The mapping may be determined by a human-user who rates the user-perceived QoE level of the application running and as the average delay of the data varies. The mapping may also be determined by mapping the average delay to a benchmark for the particular application and then mapping the benchmark to an application level performance. For example, a benchmark for an online video application, e.g., Netflix, includes the rebuffering rate and a measure of how long it takes a video to start. In some embodiments, the mapping is modeled, for example, as:

QoE=$a$ $b$*ln(average delay)

where a and b are positive constants that are calibrated depending on the application or the type of content being delivered.

In some embodiments, the application QoE metric is further determined based on other AP information collected by the cloud-based Wi-Fi service manager from the AP agent. For example, if the frequency of client disconnects is higher than a predefined threshold, then the application QoE is set to a predefined low value that indicates poor performance. In another example, if the number of PDUs dropped by the AP is higher than a predefined threshold, then the application QoE metric is set to a predefined low value that indicates poor performance. Another factor that could be combined into the QoE determination is the channel busyness. Channel busyness is the percentage of time that the airwaves are occupied by transmissions from other devices. A high level of channel busyness indicates that transmissions may be delayed. These delays may exceed the tolerance of the application in question, reducing the QoE experienced by the user. Packet error rates could also be factored in the QoE determination. Packet errors represent information that must be retransmitted with delay. These delays may exceed the delay tolerance of a given application, reducing the QoE experienced by the user. The rate at which packets are completely lost could also be an important factor in determining the QoE. Lost packets become missing information, which in the case of audio or video transmissions may result in audible clicks or noise, or artifacts on the display screen, which are displeasing to the user.

With continued reference to FIG. 6, at step 608, the performance of the AP can be monitored by the cloud-based Wi-Fi service manager based on the QoE metric determined at 606. At step 610, problems at the AP may be diagnosed by the cloud-based Wi-Fi service manager based on the QoE metric determined at 606. At step 612, the AP parameters may be optimized by the cloud-based Wi-Fi service manager based on the QoE metric determined at 606.

In process 600 described above, queue information is collected by the AP agent and sent to the cloud-based Wi-Fi service manager, and steps 604 and 606 are performed by the cloud-based Wi-Fi service manager based on the received queue information. In some embodiments, the steps performed in process 600 are all performed by the AP agent. It should be recognized that the steps (or sub-steps) in process 600 may be partitioned in different ways between the AP agent and the cloud-based Wi-Fi service manager.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving, by a cloud-based Wi-Fi service manager, an indication of a delay associated with a first queue of a plurality of queues of an access point of a local Wi-Fi network, the access point of the local Wi-Fi network configured for transmitting application data related to an application, the indication of delay observed by an access point agent loaded on the access point, each of the plurality of queues of the access point being associated with an access category of a plurality of access categories including voice, video, best-effort, and background, wherein the access point is communicatively coupled to a Wi-Fi client device within the local Wi-Fi network, and wherein the access point and the Wi-Fi client device communicate to the cloud-based Wi-Fi service manager, which is remote from the local Wi-Fi network, through a firewall and over the Internet;
characterizing the delay over time, wherein the characterization of the delay over time includes determining a statistical measure of the delay based on the received indication of the delay in the one or more of the plurality of access category queues;
determining an application quality-of-experience (QoE) metric based on a mapping from the characterization of the delay over time to an application performance as perceived by an end user, wherein the mapping is calibrated based on a type of the application or one or more types of data traffic generated by the application; and
causing optimization of configuration parameters of the access point by the cloud-based Wi-Fi service manager based on the application quality-of-experience (QoE) metric.

2. The method of claim 1, wherein the statistical measure of the delay based on the received indication of the delay associated with the first queue includes one or more of the following: an average, a percentile, a histogram, a standard deviation, a moment, a mode, a maximum, and a minimum.

3. The method of claim 1, wherein the indication of the delay associated with the first queue is determined by the access point agent loaded on the access point by periodically sampling the first queue.

4. The method of claim 1, wherein the indication of the delay associated with the first queue comprises time-stamps of when a set of data enters and leaves the first queue.

5. The method of claim 1, wherein the indication of the delay associated with the first queue comprises a queue length of the first queue.

6. The method of claim 1, wherein the indication of the delay associated with the first queue comprises a status of whether there is a queue backlog in the first queue.

7. The method of claim 1, wherein the indication of the delay associated with the first queue comprises a queue utilization metric, and wherein the queue utilization metric is determined as a fraction of time when there is a queue backlog.

8. The method of claim 1, wherein determining the statistical measure of the delay based on the received indication of the delay associated with the first queue further comprises determining the statistical measure based on queue information and arrival rate statistics, wherein the arrival rate is an estimated number of packets or frames per second that arrive at the access point.

9. The method of claim 1, wherein determining the application quality-of-experience (QoE) metric is further based on one or more of Wi-Fi metrics: the frequency of disconnects, the rate at which PDUs are dropped by the access point, channel busyness, packet error rates, and packet loss rate.

10. The method of claim 1, wherein characterizing the delay over time does not require artificially injecting packets that are unrelated to the running of the application.

11. A method comprising:
determining, at a cloud-based Wi-Fi service manager, an indication of a delay associated with a first queue of a plurality of queues of an access point of a local Wi-Fi network, the access point of the local Wi-Fi network configured for transmitting application data, the indication of delay observed by an access point agent loaded on the access point, each of the plurality of queues of the access point being associated with an access category of a plurality of access categories including voice, video, best-effort, and background, wherein the access point is communicatively coupled to a Wi-Fi client device within the local Wi-Fi network, and wherein the access point and the Wi-Fi client device communicate to the cloud-based Wi-Fi service manager, which is remote from the local Wi-Fi network, through a firewall and over the Internet;
characterizing the delay over time, wherein the characterization of the delay over time includes determining a statistical measure of the delay based on the received indication of the delay in the one or more of the plurality of access category queues;
determining an application quality-of-experience (QoE) metric based on a mapping from the characterization of the delay over time to an application performance as perceived by an end user, wherein the mapping is calibrated based on a type of the application or one or more types of data traffic generated by the application; and
causing optimization of configuration parameters of the Wi-Fi device by the cloud-based Wi-Fi service manager based on the application quality-of-experience (QoE) metric.

12. A system of a cloud-based Wi-Fi service manager remote from a Wi-Fi network, the system comprising:
a network connection to the Internet;
a processor communicatively coupled to the network interface and configured to:
receive an indication of a delay associated with a first queue of a plurality of queues of an access point of the Wi-Fi network, the access point of the Wi-Fi network configured for transmitting application data, the indication of delay observed by an access point agent loaded on the access point, each of the plurality of queues of the access point being associated with an access category of a plurality of access categories including voice, video, best-effort, and background, wherein the access point is communicatively coupled to a Wi-Fi client, device within the Wi-Fi network, and wherein the access point and the Wi-Fi client device communicate to the system through a firewall and over the Internet via the network connection;

characterize the delay over time, wherein the characterization of the delay over time includes determining a statistical measure of the delay based on the received indication of the delay in the one or more of the plurality of access category queues;

determine an application quality-of-experience (QoE) metric based on a mapping from the characterization of the delay over time to an application performance as perceived by an end user, wherein the mapping is calibrated based on a type of the application or one or more types of data traffic generated by the application; and cause optimization of configuration parameters of the access point based on the application quality-of-experience (QoE) metric; and a memory coupled to the processor and configured to provide the processor with instructions.

13. The system of claim 12, wherein the statistical measure of the delay based on the received indication of the delay associated with the first queue includes one or more of the following: an average, a percentile, a histogram, a standard deviation, a moment, a mode, a maximum, and a minimum.

14. The system of claim 12, wherein the indication of the delay associated with the first queue is determined by the access point agent on the access point by periodically sampling the first queue.

15. The system of claim 12, wherein the indication of the delay associated with the first queue comprises time-stamps of when a set of data enters and leaves the first queue.

16. The system of claim 12, wherein the indication of the delay associated with the first queue comprises a queue length of the first queue.

17. The system of claim 12, wherein the indication of the delay associated with the first queue comprises a status of whether there is a queue backlog in the first queue.

18. The system of claim 12, wherein the indication of the delay associated with the first queue comprises a queue utilization metric, and wherein the queue utilization metric is determined as a fraction of time when there is a queue backlog.

19. The system of claim 12, wherein determining the statistical measure of the delay based on the received indication of the delay associated with the first queue further comprises determining the statistical measure based on queue information and arrival rate statistics, wherein the arrival rate is an estimated number of packets or frames per second that arrive at the access point.

20. The system of claim 12, wherein determining the application quality-of-experience (QoE) metric is further based on one or more of Wi-Fi metrics: the frequency of disconnects, the rate at which PDUs are dropped by the access point, channel busyness, packet error rates, and packet loss rate.

21. The system of claim 12, wherein characterizing the delay over time does not require artificially injecting packets that are unrelated to the running of the application.

22. A computer program product embodied in a non-transitory computer readable storage medium, the computer program product being executed by a cloud-based Wi-Fi service manager and comprising computer instructions for:

receiving an indication of a delay associated with a first queue of a plurality of queues of an access point of a Wi-Fi network, the access point of the Wi-Fi network configured for transmitting application data related to an application, the indication of delay observed by an access point agent loaded on the access point, each of the plurality of queues of the access point being associated with an access category of a plurality of access categories including voice, video, best-effort, and background, wherein the access point is communicatively coupled to a Wi-Fi client device within the Wi-Fi network, and wherein the access point and the Wi-Fi client device communicate to the cloud-based Wi-Fi service manager, which is remote from the Wi-Fi network, through a firewall and over the Internet;

characterizing the delay over time, wherein the characterization of the delay over time includes determining a statistical measure of the delay based on the received indication of the delay in the one or more of the plurality of access category queues;

determining an application quality-of-experience (QoE) metric based on a mapping from the characterization of the delay over time to an application performance as perceived by an end user, wherein the mapping is calibrated based on a type of the application or one or more types of data traffic generated by the application; and causing optimization of configuration parameters of the access point based on the application quality-of-experience (QoE) metric.

* * * * *